United States Patent [19]

Sekimoto et al.

[11] Patent Number: 4,691,013
[45] Date of Patent: Sep. 1, 1987

[54] PROCESS FOR PRODUCTION OF MODIFIED HYDROXYETHYL CELLULOSE

[75] Inventors: Yukihiko Sekimoto, Chiba; Makoto Yanagita, Tokyo; Shoichi Kanda, Yokosuka, all of Japan

[73] Assignees: Lion Corporation; Nitto Chemical Industry Co., Ltd, both of Tokyo, Japan

[21] Appl. No.: 900,954

[22] Filed: Aug. 27, 1986

[30] Foreign Application Priority Data

Sep. 3, 1985 [JP] Japan .................................. 60-193141

[51] Int. Cl.$^4$ ............................................. C08B 11/20
[52] U.S. Cl. ........................................ 536/96; 536/88
[58] Field of Search ..................................... 536/96, 88

[56] References Cited

U.S. PATENT DOCUMENTS

| | | | |
|---|---|---|---|
| 4,393,163 | 7/1983 | Kanda et al. | 524/608 |
| 4,481,316 | 11/1984 | Kanda et al. | 524/93 |
| 4,614,601 | 9/1986 | Sekimoto et al. | 536/88 |

OTHER PUBLICATIONS

USSN 719,391 (filed Apr. 2, 1985), "Completion and Workover Fluids", Y. Sekimoto et al.

Primary Examiner—Paul R. Michl
Assistant Examiner—Alex H. Walker
Attorney, Agent, or Firm—Armstrong, Nikaido, Marmelstein & Kubovcik

[57] ABSTRACT

A process for producing a modified hydroxyethyl cellulose comprising the steps of:
allowing hydroxyethyl cellulose to be swollen in a solvent; and
mixing the hydroxyethyl cellulose swollen in the solvent, with a 2-mercapto benzimidazole compound having the formula (I):

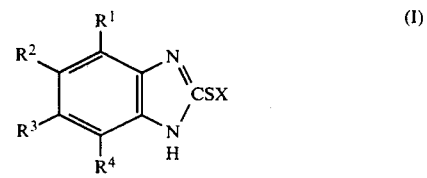

wherein $R^1$, $R^2$, $R^3$, and $R^4$ independently represent hydrogen, methyl, or ethyl, and X is hydrogen, an alkali metal, an alkaline earth metal, or ammonium.

6 Claims, No Drawings

PROCESS FOR PRODUCTION OF MODIFIED HYDROXYETHYL CELLULOSE

BACKGROUND OF THE INVENTION

1. Field of the Invention

The present invention relates to a process for producing a modified hydroxyethyl cellulose having excellent heat resistant properties and substantially no pungent smell (or irritating odor) when dissolved.

2. Description of the Related Art

Hydroxyethyl cellulose has been widely used in various industrial fields as, for example, a stabilizer for emulsion polymerization, as a dispersant for pigment in, for example, coating compositions, as a binder, a sizing agent, and a surface coating agent in paper industries, as a thickening agent in cosmetics, and as a water retention agent for cement. Furthermore, hydroxyethyl cellulose has attracted attention, in oil and gas explorations, as a viscosifier for drilling mud, well stimulating fluid, cementing fluid, completion fluid, workover fluid, or as a mobility control agent for polymer flooding or as a mobility buffer for micellar/polymer flooding in enhanced oil recovery (EOR). Recently, the exploration of oil are deeper, and thus the temperature of the oil layers is generally 40° C. to 80° C.; sometimes up to 150° C. at high temperature oil wells. Accordingly, the viscosifier having excellent heat resistant properties, which does not cause an unpreferable decrease in the viscosity even at an elevated temperature, are urgently required.

Known in the art is a method for obtaining a viscosifier having excellent heat resistant properties wherein various stabilizers are added to polyacrylamides. For example, it is disclosed in Japanese Examined Patent Publication (Kokoku) Nos. 58-47414 and 58-48583 that 2-mercapto benzimidazole compounds are used as a stabilizer. Furthermore, as a method for improving the stability of hydroxyethyl cellulose, it has been proposed in, for example, Japanese Unexamined Patent Publication (Kokai) No. 58-113201, that methyl chloride or monochloroacetic acid is added to a reaction mixture of cellulose and ethylene oxide. This method, however, can improve the stability only at room temperature.

The present inventors previously found that the decrease in the rheological characteristics, at an elevated temperature, of a conventional chemical fluid composition for well improvement comprising at least one salt selected from the group consisting of calcium chloride, calcium bromide, and zinc bromide, hydroxyethyl cellulose (HEC), and water can be suppressed by including a 2-mercapto benzimidazole compound (MBI), as proposed in Japanese Patent Application No. 59-63402 (i.e., USSN 719,391 filed on April 2, 1985, now U.S. Pat. No. 4,614,601). However, not only MBI itself but also HEC/MBI previously mixed in the form of powder disadvantageously have a pungent smell, which is not preferable from an operational viewpoint. Although this problem can be solved by automatically (or non-manually) carrying out the operation in a closed system, the automatic operation is technically and economically difficult because the operation must be locally carried out at each oil well. Thus, a manual operation must be carried out and, therefore, the removal of the pungent smell is strongly desired.

SUMMARY OF THE INVENTION

Accordingly, the objects of the present invention are to eliminate the above-mentioned disadvantages and to provide a process for producing a modified hydroxyethyl cellulose having excellent heat resistant properties and substantially no pungent smell when dissolved.

Other objects and advantages of the present invention will be apparent from the following description.

In accordance with the present invention, there is provided a process for producing a modified hydroxyethyl cellulose comprising the steps of:

allowing hydroxyethyl cellulose to be swollen in a solvent; and mixing the hydroxyethyl cellulose swollen in the solvent with a 2-mercapto benzimidazole compound having the formula (I):

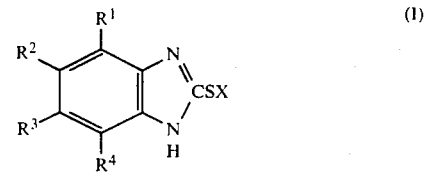

wherein $R^1$, $R^2$, $R^3$, and $R^4$ independently represent hydrogen, methyl, or ethyl, and X is hydrogen, an alkali metal (e.g., sodium, potassium), an alkaline earth metal (e.g., calcium, magnesium), or ammonium.

DESCRIPTION OF THE PREFERRED EMBODIMENTS

The hydroxyethyl cellulose (HEC) usable in the present invention may be in the form of a powder. Alternatively, HEC in the form of slurry conventionally obtained by effecting an addition reaction of ethylene oxide to an alkali cellulose dispersed in, for example, an aqueous lower aliphatic alcohol such as isopropyl alcohol or butyl alcohol, may be directly used in the present invention.

According to the present invention, the hydroxyethyl cellulose is first swollen in a solvent. The solvents usable in the present invention are water, organic solvents, and mixed solvents of water and organic solvents. The use of the mixed solvents of water and organic solvents is preferable. The preferable ratio of water/an organic solvent is 10/90 to 50/50. When water is used alone as a solvent, mixing and drying tend to become difficult because hydroxyethyl cellulose is dissolved in water to increase the viscosity. On the other hand, when an organic solvent is used alone, the uniform mixing of the 2-mercapto benzimidazole compound tends to become difficult because it becomes difficult to make the hydroxyethyl cellulose swell. The organic solvents usable in the present invention are those soluble in water except for organic acids. Typical examples of such organic solvents are methanol, ethanol, isopropyl alcohol, butyl alcohol, and acetone. These organic solvents may be used alone or in any mixture thereof.

The concentration of hydroxyethyl cellulose in the hydroxyethyl cellulose swollen in the solvent is suitably 20% to 60% by weight, preferably 30% to 50% by weight. When the concentration of hydroxyethyl cellulose is less than 20% by weight, drying after mixing tends to become difficult although a uniform mixing thereof with the 2-mercapto benzimidazole compound can be effected. Contrary to this, when the concentration of hydroxyethyl cellulose is more than 60% by weight, the swelling of the hydroxyethyl cellulose tends to become nonuniform and, therefore, the uniform mixing thereof with the 2-mercapto benzimidazole compound becomes difficult.

According to the present invention, the swollen hydroxyethyl cellulose is then mixed with the 2-mercapto benzimidazole compound having the above-mentioned formula (I). These 2-mercapto benzimidazole compounds are water-soluble. However, when the substituent X is hydrogen in the general formula (I), the solubility thereof is low. Therefore, the 2-mercapto benzimidazole compounds are preferably used in the form of, for example, sodium salts, potassium salts, and ammonium salts.

The 2-mercapto benzimidazole compound is suitably used in an amount of 0.5 to 10 parts by weight, preferably 1 to 5 parts by weight, based on 100 parts by weight of the hydroxyethyl cellulose. When the amount of the 2-mercapto benzimidazole is less than 0.5 parts by weight based on 100 parts by weight of the hydroxyethyl cellulose, an insufficient improvement of the heat resistance of the hydroxyethyl cellulose is found. Contrary to this, when the amount of the 2-mercapto benzimidazole compound is more than 10 parts by weight, the effect of the addition of the 2-mercapto benzimidazole compound is not increased and, therefore, is not economically preferred.

The 2-mercapto benzimidazole compounds may be added to and mixed with the swollen hydroxyethyl cellulose in the form of powder. Alternatively, the 2-mercapto benzimidazole compounds may be added to and mixed with the swollen hydroxyethyl cellulose in the form of a solution or dispersion thereof solved or dispersed in an organic solvent (e.g., isopropyl alcohol, acetone) or a mixed solvent of water/an organic solvent. The use of the solution of the 2-mercapto benzimidazole compound in a solvent preferably results in a more uniform mixing thereof with the swollen hydroxyethyl cellulose.

There are no critical temperatures in the mixing of the hydroxyethyl cellulose with the 2-mercapto benzimidazole compounds as long as the operation does not become complicated. For example, the mixing may be carried out at room temperature. The mixing may be carried out using, for example, any conventional agitators, various mixers or kneaders. Of these, the use of kneaders is most effective. Although the mixing time largely depends upon, for example, the types of mixing apparatus and mixing conditions, generally speaking, the mixing time of about 30 minutes to about 2 hours is sufficient.

After the mixing, the resultant modified hydroxyethyl cellulose can be obtained, optionally, by drying and/or grinding (or powdering). These treatments can be carried out in any manner (e.g., hot-air drying) conventionally used in the production of hydroxyethyl cellulose.

As explained above, according to the present invention, the modified hydroxyethyl cellulose having excellent heat resistant properties and substantially no pungent smell can be produced by uniformly mixing the swollen hydroxyethyl cellulose with the 2-mercapto benzimidazole compound. The resultant modified hydroxyethyl cellulose can be suitably used as a viscosifier in the oil or gas explorations since the decrease in the viscosity at an elevated temperature is effectively improved and the generation of the pungent smell, when dissolved at, for example, an oil well, is effectively suppressed.

EXAMPLES

The present invention will now be further illustrated by, but is by no means limited to, the following Examples, in which all percentages and parts are on the weight basis unless otherwise specified.

EXAMPLE 1

A 200 ml beaker was charged with 25 g of powdered hydroxyethyl cellulose (HEC) (i.e., cellobond 100000A commercially available from British Petroleum Chemical Co., Ltd.) and 50 g of a 90% aqueous isopropyl alcohol solution. The mixture was mixed at room temperature for one hour while agitating with a three-one motor. This caused the HEC to be swollen.

Then, the sodium salt of 2-mercapto benzimidazole (MBI-Na) was added to the swollen HEC in an amount listed in Table 1. The mixture was mixed at the same temperature for 2 hours while agitating. Thus, the modification treatment was effected. The mixture was dried at a temperature of 100° C. for 3 hours in a hot air dryer, followed by grinding. As a result, the desired modified hydroxyethyl cellulose was obtained in the form of powder.

A 10 g amount of the modified hydroxyethyl cellulose obtained above was charged into a 100 ml wide-mouthed bottle. The smell generated from the bottle was directly sampled and was evaluated according to the following evaluation standards:

+ ... Substantially no pungent smell noted.
± ... Weak pungent smell noted.
− ... Strong pungent smell noted.

The results are shown in Table 1.

On the other hand, 4 g of the resultant modified hydroxyethyl cellulose was dissolved in 350 ml of a 29.2% aqueous $CaCl_2$ solution and the initial viscosity ($A_0$) of the solution was determined. Then, after the aqueous solution was heat-treated at a temperature of 120° C. for 16 hours, the viscosity (A) of the resultant solution was determined. From the viscosity data ($A_0$ and A), the heat resistance was evaluated by the following percentage of viscosity loss.

$$\text{Viscosity loss \%} = \frac{A_0 - A}{A_0} \times 100$$

The results are shown in Table 1.

TABLE 1

| Addition amount of MBI—Na (parts based on 100 parts of HEC) | Evaluation result | |
|---|---|---|
| | Smell | Viscosity loss (%) |
| 0 | + | 98 |
| 0.5 | + | 36 |
| 2.5 | + | 17 |
| 5.0 | + | 15 |

EXAMPLE 2

The modified HEC was obtained in the same manner as in Example 1, except that a solvent listed in Table 2 was used as a solvent for swelling the HEC instead of a 90% aqueous isopropyl alcohol solution and 2.5% of the sodium salt of methyl-2-mercapto benzimidazole (i.e., $R^1-R^4=CH_3$, X=Na in the formula (I), MMBI-Na) was used.

The smell generation and the viscosity loss % were evaluated in the same manner as in Example 1. The results are shown in Table 2.

TABLE 2

| | Evaluation | |
|---|---|---|
| Solvent | Smell | Viscosity loss (%) |
| Water/Isopropanol = 5/95 | ± | 24-19* |
| Water/Isopropanol = 10/90 | + | 17 |
| Water/Isopropanol = 50/50 | + | 20 |
| Water/Isopropanol = 60/40 | ± | 25 |
| Water/Acetone 50/50 | + | 21 |
| Water/Ethanol 10/90 | + | 19 |

*Where water/isopropanol = 5/95, the mixing of MMBI—Na was nonuniform and the viscosity loss % was varied because the HEC was not sufficiently swollen.

EXAMPLE 3

The modified HEC was prepared in the same manner as in Example 1, except that an HEC slurry was synthesized from cellulose instead of the commercially available HEC used in Example 1, and the mixing was carried out in a bench kneader.

The HEC slurrry was synthesized as follows.

To 100 parts of cotton linter pulp, 1350 parts of a 90% aqueous isopropanol solution and 148 parts of a 25% aqueous caustic soda solution were added. The mixture was charged into a kneader type reactor and then stirred at a temperature of 15°0 C. for one hour to prepare an alkali cellulose. Then, 217 parts of ethylene oxide were added to the alkali cellulose. After thoroughly mixing, the mixture was allowed to be reacted at a temperature of about 50° C. for 4 hours. After completing the reaction, the reaction mixture was neutralized with HCl to obtain the desired HEC slurry. The evaluation results of the modified hydroxyethyl cellulose are shown in Table 3.

TABLE 3

| Addition amount of MBI—Na | Evaluation result | |
|---|---|---|
| (parts based on 100 parts of HEC) | Smell | Viscosity loss (%) |
| 0.5 | + | 20 |
| 2.5 | + | 14 |
| 5.0 | + | 5 |

EXAMPLE 4

A 0.3 g amount of the modified HEC obtained in Example 1 was dissolved in 100 g of a mixed aqueous solution of 2% NaCl and 0.2% $CaCl_2$ to prepare a polymer solution for use in an EOR method.

The aqueous polymer solution obtained above was sealed in an ampoule under nitrogen and was then aged at a temperature of 50° C. in a constant temperature bath for 60 days. The smell and the viscosity loss % were evaluated in the same manner as in Example 1.

The results are shown in Table 4.

TABLE 4

| Addition amount of MBI—Na | Evaluation result | |
|---|---|---|
| (parts based on 100 parts of HEC) | Smell | Viscosity loss (%) |
| 0.5 | + | 10 |
| 5 | + | 5 |
| 10 | + | 1 |

We claim:

1. A process for producing a modified hydroxyethyl cellulose comprising the steps of:
   allowing hydroxyethyl cellulose to be swollen in a solvent; and
   mixing the hydroxyethyl cellulose swollen in the solvent with a 2-mercapto benzimidazole compound having the formula (I):

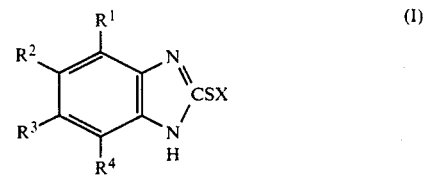

wherein $R^1$, $R^2$, $R^3$, and $R^4$ independently represent hydrogen, methyl, or ethyl, and X is hydrogen, an alkali metal, an alkaline earth metal, or ammonium.

2. A process as claimed in claim 1, wherein the solvent is water, an organic solvent, or a mixture thereof.

3. A process as claimed in claim 2, wherein the solvent is a mixture of water and an organic solvent at a ratio of water/the organic solvent of 10/90 to 50/50.

4. A process as claimed in claim 3, wherein the organic solvent is methanol, ethanol, isopropyl alcohol, butyl alcohol, acetone, or a mixture thereof.

5. A process as claimed in claim 1, wherein the concentration of the hydroxyethyl cellulose is 20% to 60% by weight.

6. A process as claimed in claim 1, wherein the 2-mercapto benzimidazole compound is used in an amount of 0.5 to 10 parts by weight, based on 100 parts by weight of the hydroxyethyl cellulose.

* * * * *